(No Model.)
C. E. LITTLE.
GATE.
No. 413,527. Patented Oct. 22, 1889.
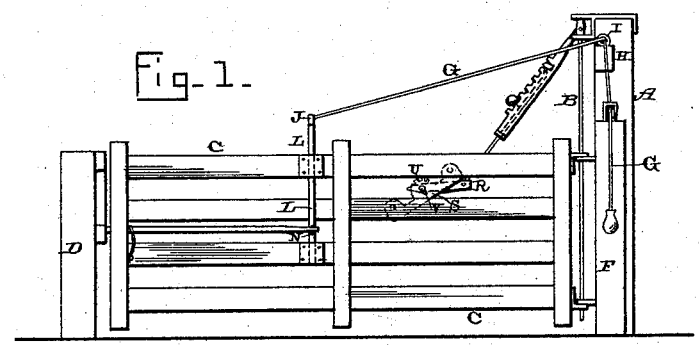
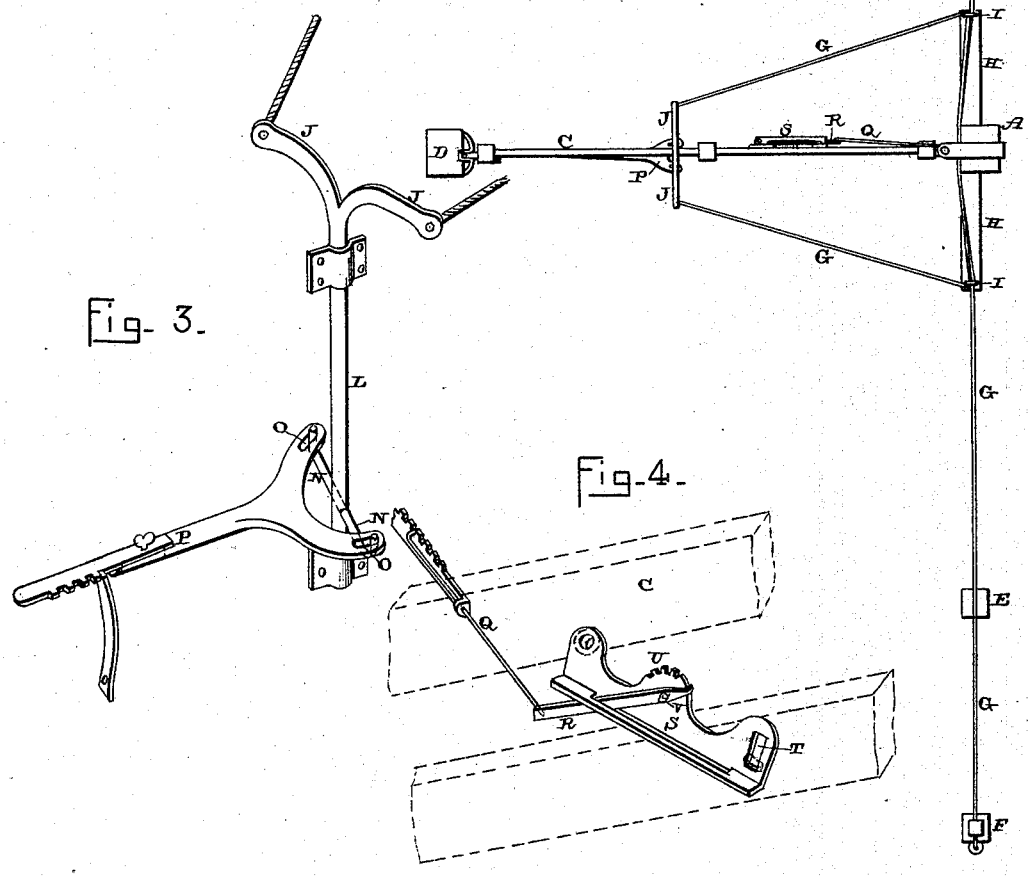
Witnesses:
E. P. Ellis,
J. M. Nesbit.
Inventor:
C. E. Little,
per F. A. Lehmann,
Atty.

UNITED STATES PATENT OFFICE.

CHARLES EDWARD LITTLE, OF MOUNT CARROLL, ILLINOIS.

GATE.

SPECIFICATION forming part of Letters Patent No. 413,527, dated October 22, 1889.

Application filed May 18, 1889. Serial No. 311,261. (No model.)

*To all whom it may concern:*

Be it known that I, CHARLES EDWARD LITTLE, of Mount Carroll, in the county of Carroll and State of Illinois, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the combination of the gate, a supporting brace wire or rod which is attached at its upper end to the pivotal rod upon which the gate swings, a lever to which the lower end of the rod or wire is attached, and a casting provided with teeth with which the end of the lever engages for the purpose of holding the gate at any desired elevation, as will be more fully described hereinafter.

The objects of my invention are to provide a gate which can be opened and closed by pulling upon a wire, cord, or chain, which is attached to the gate-latch, thus avoiding the necessity of having to dismount for the purpose, and to provide a mechanism whereby the gate can be raised vertically, so as to freely pass over snow-drifts or to allow small animals to pass under it.

Figure 1 is a side elevation which embodies my invention complete. Fig. 2 is a plan view of the same. Fig. 3 is a detached view of the mechanism for operating the latch. Fig. 4 is a detached view of the devices for holding the gate in a raised position.

A represents the post upon which the gate is hung by means of the rod B; C, the gate; D, the post against which the gate closes; E, the posts against which the gate stops when open, and F the posts which serve as supports for the outer ends of the cords, wires, or chains G, by means of which the latch is operated and the gate opened and closed from a distance without the necessity of the rider's or driver's dismounting for that purpose.

The gate C is made perfectly rigid, so that when it is to be raised all parts will be raised alike, and is hung upon the rod B, which turns in its bearings with the gate as it is opened and closed. Secured to the post A and extending at right angles to the gate when it is closed is the guide-bar H, which is provided with guides or pulleys I at each of its ends, by which the cords or ropes are supported in position. The inner ends of these cords, wires, or chains G are fastened to the outwardly-turned arms J of the partially-revolving vertical shaft L, which is mounted in suitable bearings upon the gate. Extending from opposite sides of this shaft are the levers N, which have upturned ends passing through the slots O in the bifurcated ends of the spring-actuated latch P. This latch P extends horizontally along the gate, and is supported at its inner or rear end by the levers N, as shown.

When one of the cords G is pulled, a turning movement is imparted to the shaft L through the arms to which the cord, wire, or chain is attached, and this pull first turns the shaft L, so as to operate the latch P to free the gate, and then the pull causes the gate to open or close away from the person pulling the cord, wire, or chain.

If the gate is closed and one end of one of the cords G is pulled, the gate is opened away from the person, and after the person has passed through the gate, if the outer end of the other cord, wire, or chain is pulled the gate is closed. No matter in which direction the shaft L is turned, it pulls the latch P backward, so as to free the gate and allow it to open.

Fastened to the upper end of the pivotal rod B is a rod or wire Q, and the lower end of this wire or rod is fastened to the end of the lever R, which is pivoted upon the casting S, secured diagonally to two of the boards of the gate. This casting is of the shape shown and provided with the slot T at one end and the teeth U at its center, the teeth being arranged upon the curve, as shown. By means of the slot T all sag in the gate can be taken up by first loosening the clamping-bolt, which passes through the slot, then raising up the outer end of the gate until it is level, which will cause a movement of the lower end of the casting S in relation to said bolt, then tightening the clamping-bolt again, which holds the gate in this adjusted position. The gate can be made to swing perfectly even and true at all times by means of the casting having the slot in its end and of the clamping-bolt.

The pivot of the lever R passes through a slot V in the casting S, so as to allow the lever which is fastened at its outer end to the wire or rod Q a sufficient endwise movement to free its bent or hooked end from the teeth U, with which it engages. When the gate is to be raised, the lever R is forced endwise from its lower end, and then its bent or hooked upper end becomes disengaged from the teeth U, and by forcing downward the lower end of the lever the gate will be raised evenly upward to any desired height, so as to swing freely over snow-drifts, and to allow small stock to pass back and forth under it. When it is desired to lower the gate, it is only necessary to force the lever endwise sufficiently to free its upper end from the teeth, and then the gate will sink from its own gravity. As shown, the rod Q is made in two parts, and these parts can be adjusted one upon the other for the purpose of adjusting the rods to high or low posts. The latch P may also be made in two parts, one of which is adjustable upon the other, as shown in Fig. 3.

Having thus described my invention, I claim—

1. The combination of the gate, the pivotal rod upon which the gate is hung, the casting secured to the gate and provided with teeth, the lever pivoted to the casting and engaging said teeth with its free end, and a brace rod or wire having its lower end connected to the opposite end of the lever and its upper end connected to the rod upon which the gate is hung, substantially as described.

2. The combination of the gate with the casting S, diagonally secured to two of the parts of the gate and provided with a slot at one end, through which a clamping-bolt is passed, a lever pivoted to the casting, the rod upon which the gate is hung, and a rod, wire, or brace connected to the lever and the said pivotal rod, whereby the sag in the gate can be taken up, substantially as set forth.

3. The combination of the gate and the casting S, (which is diagonally secured thereto and provided with a slot at its center and a series of teeth arranged upon a circle,) with the lever R, pivoted in the slot so as to have an endwise movement, and having its upper end hooked so as to engage with the teeth, the pivotal rod or bolt upon which the gate is hung, and the brace rod or wire Q, connecting one end of the lever and the pivotal rod, substantially as specified.

In testimony whereof I affix my signature in presence of two witnesses.

CHARLES EDWARD LITTLE.

Witnesses:
CHAS. C. FARMER,
NELSON FLETCHER.